(12) United States Patent
Amako et al.

(10) Patent No.: US 7,339,734 B2
(45) Date of Patent: Mar. 4, 2008

(54) POLARIZATION CONTROL ELEMENT, MANUFACTURING METHOD OF POLARIZATION CONTROL ELEMENT, DESIGN METHOD OF POLARIZATION CONTROL ELEMENT, AND ELECTRONIC EQUIPMENT

(75) Inventors: Jun Amako, Matsumoto (JP); Daisuke Sawaki, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 106 days.

(21) Appl. No.: 11/271,864

(22) Filed: Nov. 14, 2005

(65) Prior Publication Data

US 2006/0146231 A1 Jul. 6, 2006

(30) Foreign Application Priority Data

Dec. 22, 2004 (JP) ............................. 2004-371264

(51) Int. Cl.
  *G02B 5/30* (2006.01)
(52) U.S. Cl. ........................................ 359/486; 359/900
(58) Field of Classification Search .................. None
See application file for complete search history.

(56) References Cited

U.S. PATENT DOCUMENTS 5,007,708 A * 4/1991 Gaylord et al. ............. 359/569

| | | |
|---|---|---|
| 6,122,103 A | 9/2000 | Perkins et al. |
| 6,243,199 B1 | 6/2001 | Hansen et al. |
| 2004/0008416 A1* | 1/2004 | Okuno ........................ 359/566 |
| 2004/0051927 A1* | 3/2004 | Tsai et al. ................... 359/245 |
| 2005/0030627 A1* | 2/2005 | Kleemann et al. .......... 359/571 |

* cited by examiner

*Primary Examiner*—Stephone B. Allen
*Assistant Examiner*—Lee Fineman
(74) *Attorney, Agent, or Firm*—Oliff & Berridge, PLC

(57) ABSTRACT

A manufacturing method of a polarization control element which is placed in a first medium and used and which is provided with a striped structure of a period shorter than a wavelength of light to be subject to control, the manufacturing method of a polarization control including:

a first process which sets element conditions such as to meet a relationship $Re[e1]>0$, $fRe[e1]+(1-f)Re[e2]<0$, and $Im[e2]>0$, where a complex dielectric constant of the first medium is e1, a complex dielectric constant of a second medium constituting the striped structure is e2, a fill factor of the second medium is $f(0<f<1)$, a real part of the complex number is Re, and an imaginary part is Im, and a second process selecting the second medium such as to meet the element conditions set in the first process and forming the striped structure.

3 Claims, 10 Drawing Sheets

POLARIZATION CONTROL ELEMENT, MANUFACTURING METHOD OF POLARIZATION CONTROL ELEMENT, DESIGN METHOD OF POLARIZATION CONTROL ELEMENT, AND ELECTRONIC EQUIPMENT

BACKGROUND OF THE INVENTION

1. Technical Field

The invention relates to a polarization control element, which uses polarization anisotropy created by a structure shorter than a wavelength of light to be used (hereinafter referred to as the "sub-wavelength structure").

2. Related Art

In recent years, a polarization control element constituted by inorganic materials is attracting attention. Such polarization control element has higher light resistance and heat resistance than the polarization control element of a currently available type using organic materials. Much expectation is entertained for its application to a variety of optical equipment that utilizes polarization.

There have been made several proposals on the polarization control element made up of the sub-wavelength structure. For example, in the U.S. Pat. No. 6,122,103 specification (a first example of related art) and the U.S. Pat. No. 6,244,3199 specification (a second example of related art), it is disclosed to the effect that a periodic metal grid pattern (striped structure) formed on a transparent substrate such as a glass substrate functions as the polarization control element. Further, it is mentioned in these documents to the effect that as metallic materials to form the metallic grid pattern, aluminum and silver may be employed.

However, in each of the above-referenced documents, guidelines not only for selecting a metallic material to form for the metallic grid pattern but also for engineering its optical constant are not disclosed. Since selection of the material and design of the optical constant are determined on a trial and error basis, through trial and error, it is unknown whether aluminum and silver illustrated in each of the documents is truly the best choice or not.

As a result, it is desired to develop a method (or methodology) which makes it possible to provide guidelines as to which material having what properties should be selected or how new material development should proceed, if a polarization control element having better properties by making effective use of a high potential of the sub-wavelength structure is to be realized.

The U.S. Pat. No. 6,122,103 specification is a first example of related art. The U.S. Pat. No. 6,243,199 specification is a second example of related art.

SUMMARY

An advantage of some aspects of the invention is to provide a method that makes it possible to produce a polarization control element having better properties.

A first aspect of the invention is a manufacturing method of a polarization control element which is placed in a first medium (for example, air) and used and which is provided with a striped structure of a period shorter than the wavelength of light to be subject to control, the manufacturing method of a polarization control including a first process which sets element conditions such as to meet a relationship $Re[e1]>0$, $fRe[e1]+(1-f)Re[e2]<0$, and $Im[e2]>0$, where a complex dielectric constant of the first medium is e1, a complex dielectric constant of a second medium constituting the striped structure is e2, a fill factor of the second medium is $f(0<f<1)$, a real part of the complex number is Re, and an imaginary part is Im; and a second process selecting the second medium such as to meet the element conditions set in the first process and forming the striped structure.

According to the invention, based on a relatively simple conditional expression, guidelines for selecting suitable materials to realize a polarization control element made up of the sub-wavelength structure is clarified. Hence, a degree of freedom of structural design expands considerably, so that there is no necessity of designing elements under a limited category of candidates for materials (for example, aluminum and silver).

This enables the optimum sub-wavelength structure to be realized and a polarization control element of better properties to be obtained.

A second aspect of the invention is a designing method of a polarization control element provided with a striped structure of a period shorter than the wavelength of light to be subject to control, the designing method of a polarization control element designing element conditions such as to meet a relationship $Re[e1]>0$, $fRe[e1]+(1-f)Re[e2]<0$, and $Im[e2]>0$, where a complex dielectric constant of the first medium is e1, a complex dielectric constant of the second medium constituting the striped structure is e2, a fill factor of the second medium is $f(0<f<1)$, a real part of the complex number is Re, and an imaginary part is Im.

According to the invented method, it is made possible to design element conditions of a polarization control element having better properties.

A third aspect of the invention is a polarization control element manufactured by using the manufacturing method according to the first aspect of the invention. Specifically, the third aspect of the invention is a polarization control element which is placed in the first medium and used and which is provided with the striped structure of a period shorter than the wavelength of light to be subject to control, the polarization control element including being formed of the striped structure constituted by the second medium such as to meet a relationship $Re[e1]>0$, $fRe[e1]+(1-f)Re[e2]<0$, and $Im[e2]>0$, where a complex dielectric constant of the first medium is e1, a complex dielectric constant of the second medium constituting the striped structure is e2, a space occupancy rate of the second medium is $f(0<f<1)$, a real part of the complex number is Re, and an imaginary part is Im.

If a polarization control element is formed so that such conditional expressions are met, it is possible to obtain a polarization control element having better properties.

A fourth aspect of the invention is electronic equipment provided with a polarization control element manufactured by a manufacturing method according to the first aspect of the invention. As electronic equipment provided with such polarization control element according to the invention, a liquid crystal projector having a liquid crystal display that uses a polarization control element may be typically cited.

BRIEF DESCRIPTION OF THE DRAWINGS

The invention will be described with reference to the accompanying drawings, wherein like numbers reference like elements.

DESCRIPTION OF THE EMBODIMENTS

Embodiments of the invention will be described below with reference to the drawings.

Figure 1:
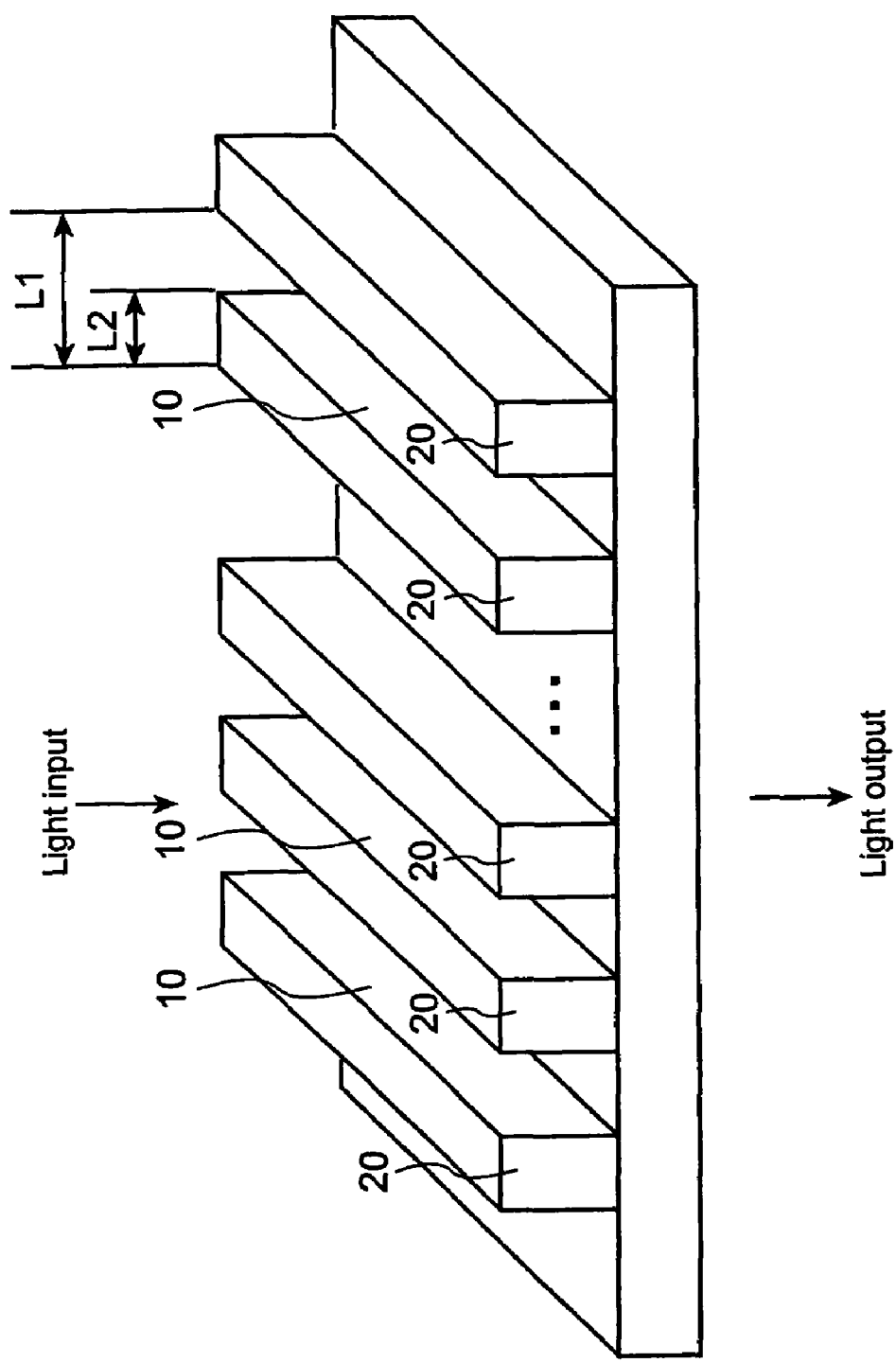
FIG. 1 is a perspective view schematically explaining a structure of a polarization control element.

FIG. 1 is a perspective view schematically explaining a structure of a polarization control element of the embodiment. The polarization control element of the embodiment shown in FIG. 1 is placed in a first medium 10 such as air and used to control a polarization condition of light incident from one side. It is equipped with a striped structure consisting of a second medium 20 periodically arranged as illustrated.

Where a complex dielectric constant of the first medium is e1, a complex dielectric constant of a second medium is e2, a space occupancy rate of the second medium is f(0<f<1), a real part of the complex number is Re, and an imaginary part is Im, the polarization control element of the embodiment is such that a striped structure consisting of the second medium 20 is formed so as to meet each of the following relations. The space occupancy rate f herein is expressed as a ratio of a repeating period L1 of the second medium 20 with respect to a width L2 of the second medium 20 and each width L2 of the second medium 20(L2/L1), its value being 0<f<1.

$$Re[e1]>0 \quad (1\text{-}1)$$

$$fRe[e1]+(1-f)Re[e2]<0 \quad (1\text{-}2)$$

$$Im[e2]>0 \quad (1\text{-}3)$$

Validity of the condition expressed by each formula from (1-1) to (1-3) will be described below.

First, to know behavior of the sub-wavelength structure with respect to light, its complex dielectric constant is to be studied. The complex dielectric constant of the first medium e1 and the complex dielectric constant of the second medium e2 are respectively expressed as follows, where j is an imaginary number unit.

$$e1=a$$

$$e2 b+jc$$

According to *Effective Medium Theory* (Principles of Optics, 6$^{th}$ Ed., New York, (Pergamon, 1980), sect. 14.4.2), the complex dielectric constant with respect to linearly polarized incident light is given in approximation by the following equations.

With respect to TE polarized light $$\begin{aligned} e(TE) &= fe1 + (1-f)e2 \\ &= f(a+b) + j(1-f)c \end{aligned} \quad (2\text{-}1)$$

With respect to TE polarized light:

$$\begin{aligned} 1/e &= (TM) = f\,[1/e1] + (1-f)[1/e2] \\ &= f\,[1/a] + (1-f)[1/(b+jc)] \end{aligned} \quad (2\text{-}2)$$

Here, for the sake of explanation, it is assumed that the first medium 10 is air (a=1,0), the second medium 20 is a metal (b<0, c>0), and the space occupancy rate is f=0.5. The above-described complex dielectric constants are rewritten respectively as follows.

$$e(TE)=(1+b)/2+jc/2 \quad (3)$$

$$e(TM)=2[(b^2+b+c^2)/(1+b)^2+c^2)]+j2[c/(1+b)^2+c^2)] \quad (4)$$

If the imaginary part of e(TM) given by equation (4) is considered a function g(c) of an imaginary part c of the complex dielectric constant of the second medium 20, its primary derivative function g'(c) is obtained as follows.

$$g'(c)=2[(1+b)+c][(1+b)-c]/[(1+b)^2+c^2]^2 \quad (5)$$

Given this, if c=−(1+b), g(c) reaches a maximum, and its value $g_{max}$ is expressed as follows.

$$g_{max}=1/1|1+b| \quad (6)$$

From equation (6), the following is clear in regard to the behavior of the sub-wavelength structure with respect to light.

With respect to the TE polarized light

From equation (3), if (1+b<0, it is always Re[e(TE)]<0. This means that the sub-wavelength structure responds like a metal to the TE polarized light. Namely, most of the incident light is reflected. A degree of absorption loss of light depends on the size of c.

With respect to the TM polarized light

From equation (4), if (1+b)<0, it is always Re[e(TM)]>0. This means that the sub-wavelength structure responds like a dielectric to the TE polarized light. Namely, most of the incident light is transmitted. A degree of absorption loss of light depends on the magnitude of c. To reduce this loss, it is obvious from equation (6) that what is needed is to enlarge |1+b|.

Element conditions of the polarization control element are set based on the embodiment, and validity of forming the striped structure by selecting the second medium so as to meet the element conditions is verified. In the following, verification is made by making a comparison of three different models.

It should be noted that the period of the striped structure (sub-wavelength structure) is 140 nm, the fill factor is f=0.50, the substrate supporting the striped structure is glass (n=1.50, k=0.0), with the conditions being common among the three models.

$$1+b<0, \quad c>0 \qquad \text{Condition 1}$$

For example, it is assumed that the second medium 20 is formed of aluminum as its material. If the wavelength of light to be used is 650 nm, a refractive index n and an extinction coefficient k of aluminum are n+jk=1.57+j7.97. From this, the complex dielectric constant of the second medium consisting of aluminum becomes e2=−61.1+j25.0, where b=−61.1 and c=25.0.

Based on the equation (3) and the equation (4), the complex dielectric constants with respect to the TE polarized light and the TM polarized light are respectively obtained as follows.

$$e(TE)=-30.53+j12.51$$

$$e(TM)=2.02+j0.0118$$

And, n and k for each polarized light are obtained as n+jk=1.110+j5.636 for TE and n+jk=1.421+j0.004151 for TM. Intensity of reflected light (SumR) and intensity of transmitted light (SumT), which are computed using the effective medium theory with these n's and k's, are plotted as functions of a depth of the medium. Results are shown in FIG. 2A and FIG. 2B.

Figure 2A:
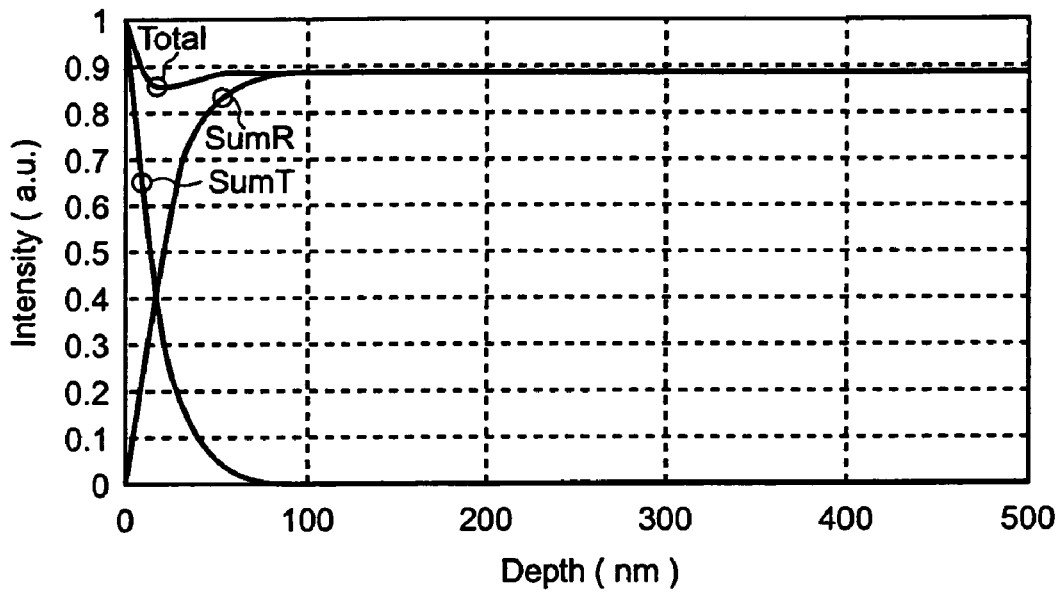
FIGS. 2A and 2B show diagrams to explain polarization properties of the polarization control element in Condition 1.
Figure 2B:
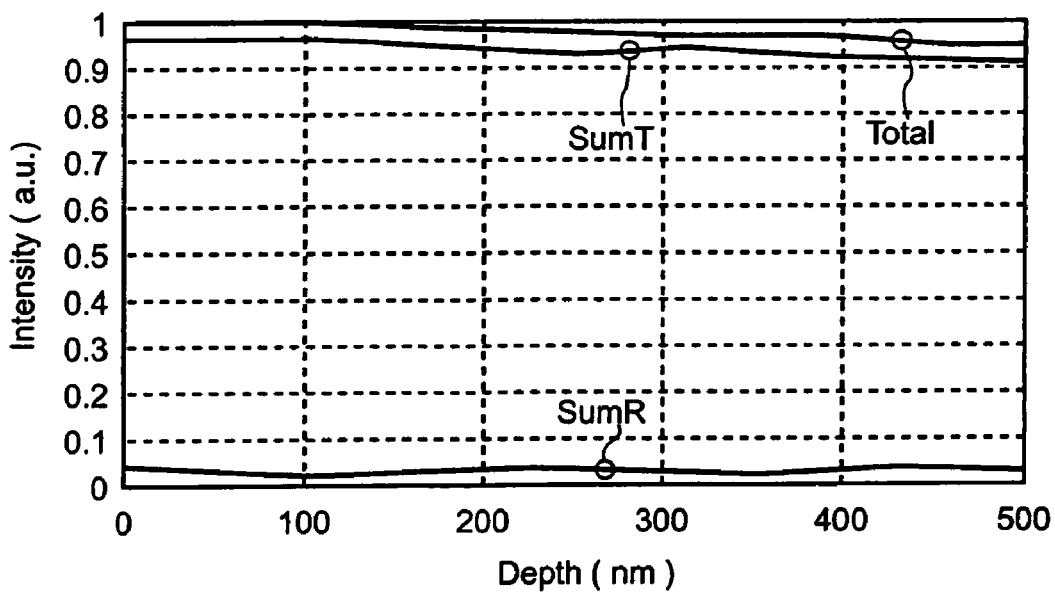

From FIG. 2A, it is clear that a response of an aluminum grid (striped structure) is "metallic" in regard to the TE polarized light. In a range of more than 100 nm of the depth of the medium, the intensity of the reflected light is almost leveled out. This means that the depth of light that can penetrate aluminum is about 100 nm at most.

Due to plasmon excited through irradiation of the TE polarized light, nearly all light (about 90%) is reflected. There exists a small quantity of loss (about 10%) due to light absorption generated in an area of a light penetrable depth. On the other hand, from FIG. 2B, it is clear that the response of the aluminum grid (striped structure) is "dielectric" in regard to the TM polarized light.

Figure 3A:
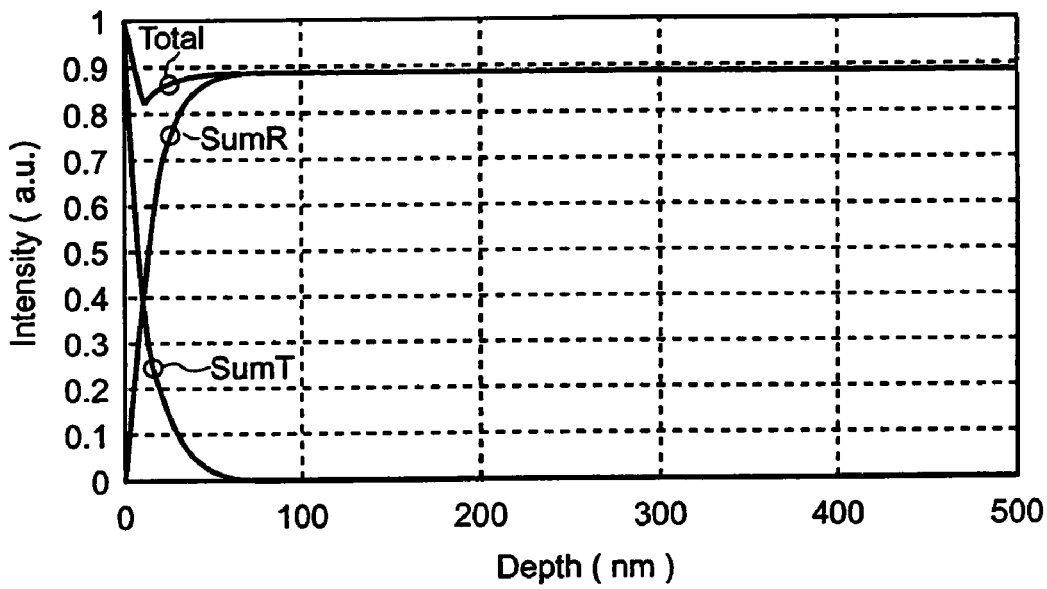
FIGS. 3A and 3B show diagrams to explain polarization properties of the polarization control element in comparison examples.
Figure 3B:
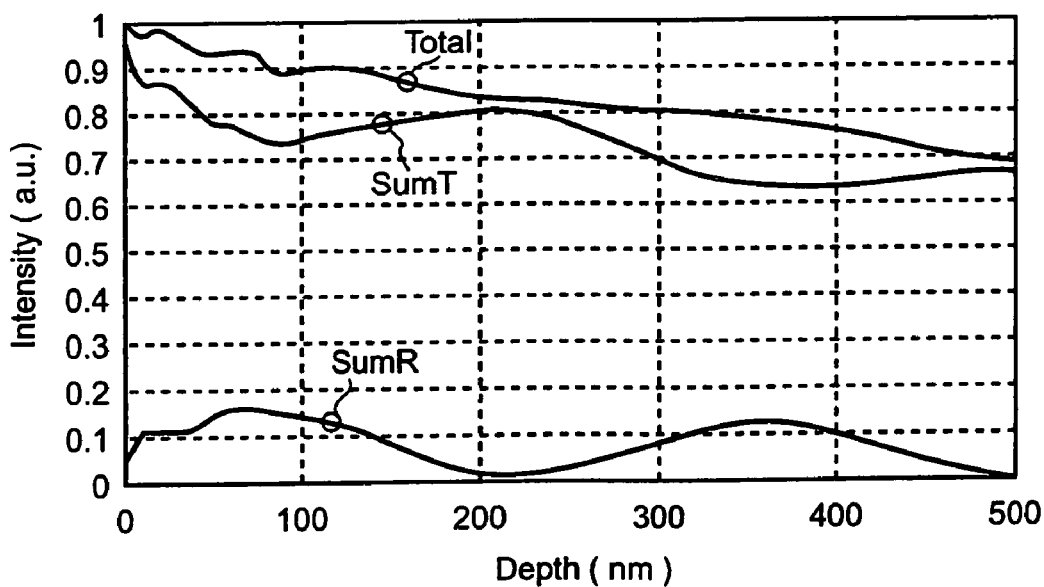

Based on the results of the approximate computation, it is understood that the sub-wavelength structure determined by the condition functions as the polarization control element. Results of a rigorous computation on the optical response of the aluminum grid to confirm this are shown in FIG. 3A and FIG. 3B. As far as the TE polarized light is concerned, results of approximate computation with the uniform medium (refer to FIG. 2A) and the results of the rigorous computation (FIG. 3A) are shown to be in good agreement.

On the other hand, as regards the TM polarized light, the results of the approximating with the uniform medium (refer to FIG. 2B) and the results of the approximate computation (FIG. 3B), despite a slight difference between absolute values, look very alike in terms of responding like a dielectric.

It should be pointed out that in the results of the rigorous computation reveal maximums and minimums in the intensity of reflected light (SumR) and the intensity of transmitted light (SumT) is due to an interference between the aluminum grid and its surrounding media (air and a glass substrate). The "rigorous computation" in the specification herein refers to a modeling of computing electromagnetic fields inside and outside the sub-wavelength structure using a rigorous coupled-waves analysis. This analysis method is, for example, described in a document, M. G. Moharam and T. K. Gaylord, J. Opt. Soc. Am. 71, 811-818(1981).

$$1+b\neq 0, \quad c>0 \qquad \text{Condition 2}$$

For example, it is assumed that the second medium 20 is formed of molybdenum as its material. If the wavelength of light to be used is 650 nm, the refractive index n and the extinction coefficient k of molybdenum are n+jk=3.731+j3.574. From this, the complex dielectric constant of the second medium consisting of molybdenum becomes e2=1.147+j26.67, where b=1.147 and c=26.67.

Based on the equation (3) and the equation (4), the complex dielectric constants with respect to the TE polarized light and the TM polarized light are respectively obtained as follows.

$$e(TE)=1.07+j13.3$$

$$e(TM)=1.99+j0.075$$

And, n and k for each polarized light are obtained as n+jk=2.69+j2.48 for TE and n+jk=1.41+j0.027 for TM. The intensity of reflected light (SumR) and the intensity of transmitted light (SumT) which are computed using the effective medium theory with these n's and k's, are plotted as functions of the depth of the medium. Results are shown in FIG. 4A and FIG. 4B.

Figure 4A:
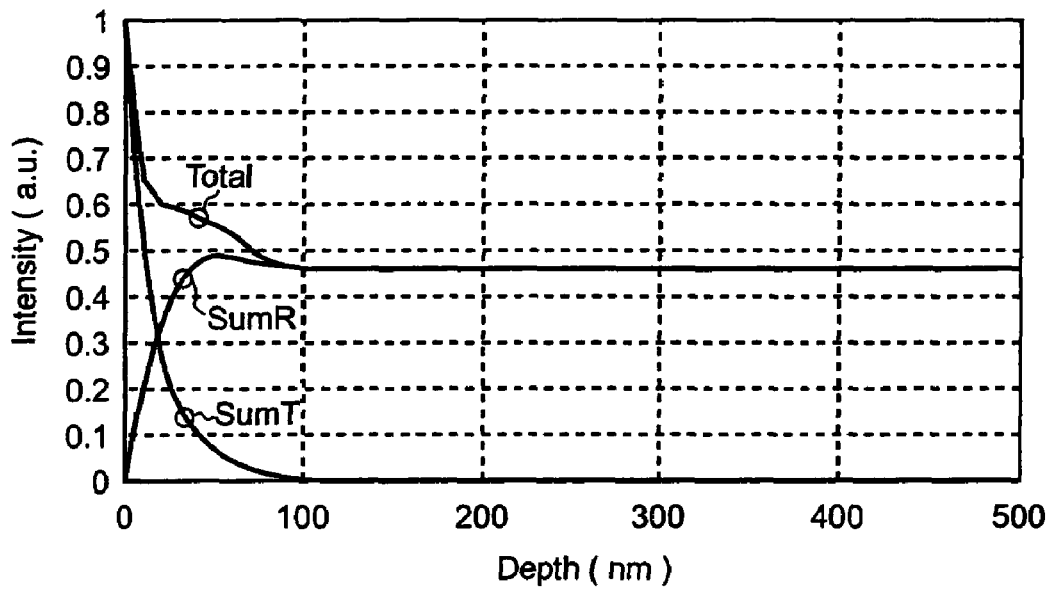
FIGS. 4A and 4B show diagrams to explain the polarization properties of the polarization control element in Condition 2.

From FIG. 4A, it is clear that the response of the molybdenum grid (striped structure) is "metallic" in regard to the TM polarized light. In a range of more than 100 nm of the depth of the medium, the intensity of the reflected light are almost leveled out standing less than 50%.

By comparison to the case of Condition 1, the absorption loss of light is far greater. This is caused by the real part of the complex dielectric constant with respect to the TE polarized light. In the case of Condition 1, the relationship of Re [e1]+(1−f) Re [e2]<0 is met. On the other hand, in Condition 2, that relationship is not satisfied.

Figure 4B:
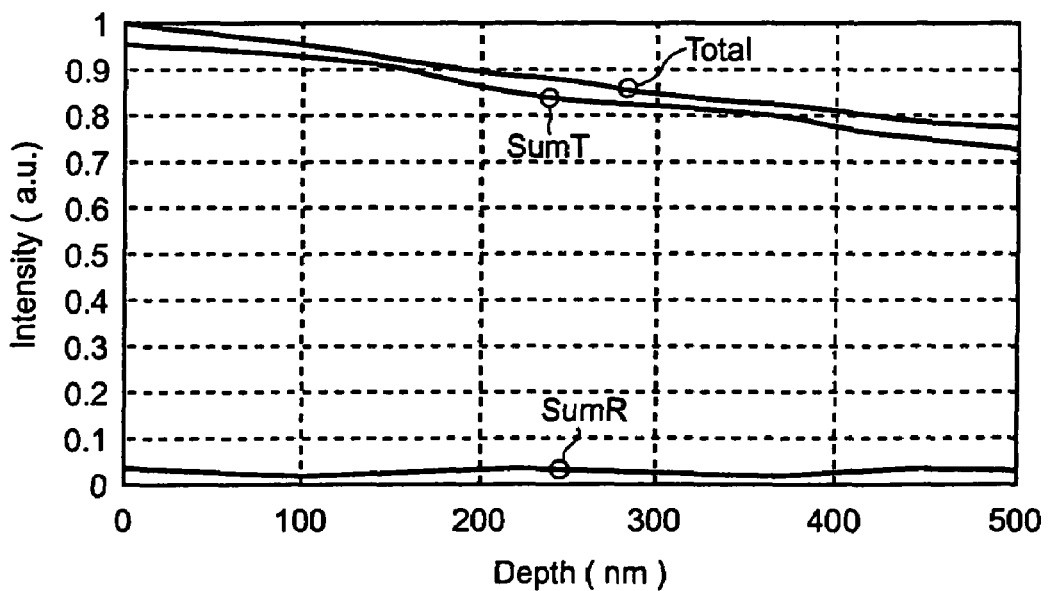

On the other hand, from FIG. 4B, it is clear that the response of the molybdenum grid is "dielectric" in regard to the TM polarized light. However, by comparison to the case of Condition 1, the absorption loss of light is far greater. This is due to the imaginary part of the complex dielectric constant with respect to the TM polarized light and the fact that the dielectric constant in Condition 2 is about 6 times greater than that in Condition 1.

Figure 5A:
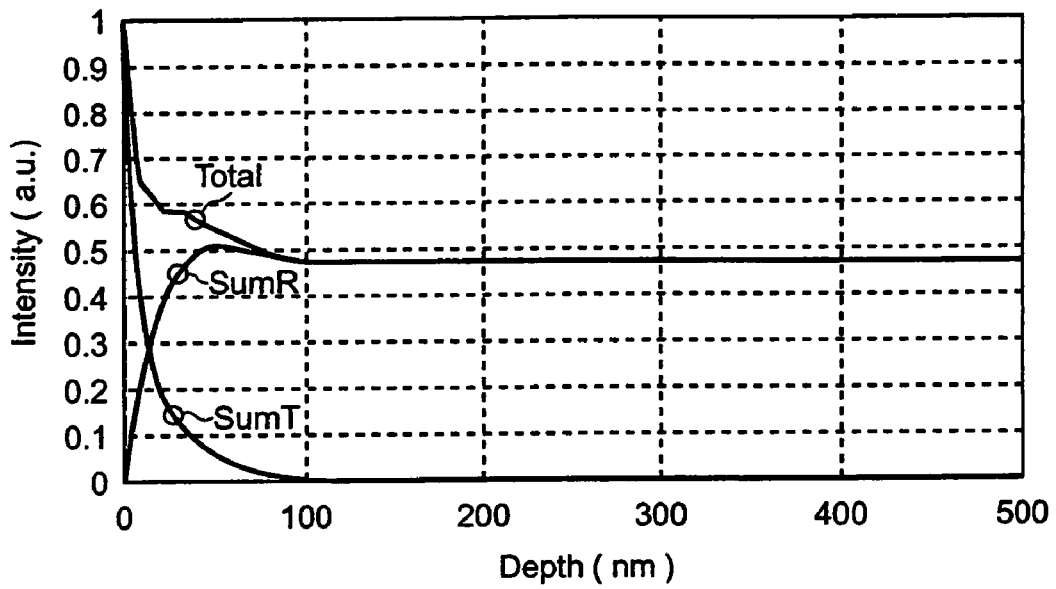
FIGS. 5A and 5B show diagrams to explain polarization properties of the polarization control element in comparison examples.
Figure 5B:
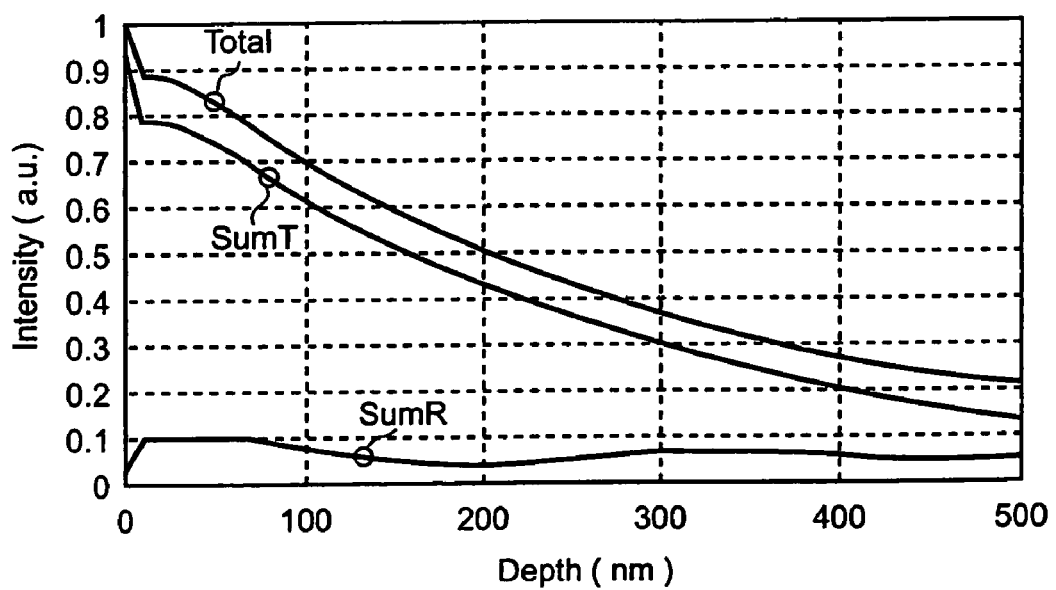

Based on the results of computation, it is clear that the sub-wavelength structure determined by the condition does not function effectively as the polarization control element. Results of the rigorous computation on the optical response of the molybdenum grid to confirm this are shown in FIG. 5A and FIG. 5B. As far as the TE polarized light is concerned, the results of the approximate computation (refer to FIG. 5A) and the results of the rigorous computation (FIG. 3A) are shown to be in good agreement.

On the other hand, as regards the TM polarized light, the results of the approximate computation (refer to FIG. 4B) and the results of the rigorous computation (FIG. 5B), despite a slight difference between the absolute values, look very alike in terms of responding like a dielectric.

It should be pointed out that of the materials which are actually available, molybdenum was selected as what could satisfy 1+b=0 in approximation and the results of computations were shown. Nevertheless, even if those computations are made under a condition that strictly meets 1+b=0, approximately the same result as the case of molybdenum can be obtained.

$$1+b>0, c>0 \quad \text{Condition 3}$$

For example, it is assumed that the second medium 20 is formed of quartz glass as its material. If the wavelength of light to be used is set as 650 nm, the refractive index n and the extinction coefficient k of the quartz glass are n+jk=1.459+j0.0 From this, the complex dielectric constant of quartz glass becomes e2=2.129+j0.0, where b=2.129 and c=0.0.

Based on the equation (3) and the equation (4), the complex dielectric constants with respect to the TE polarized light and the TM polarized light are respectively obtained as follows.

$$e(TE)=-1.565+j0.0$$

$$e(TM)=1.361+j0.0$$

And, n and k for each polarized light are obtained as n+jk=1.251+J0.0 for TE and n+jk=1.167+j0.0 for TM. The intensity of reflected light (SumR) and the intensity of transmitted light (SumT), which are computed using the effective medium theory with these n's and k's, are plotted as functions of the depth of the medium. Results are shown in FIG. 6A and FIG. 6B.

Figure 6A:
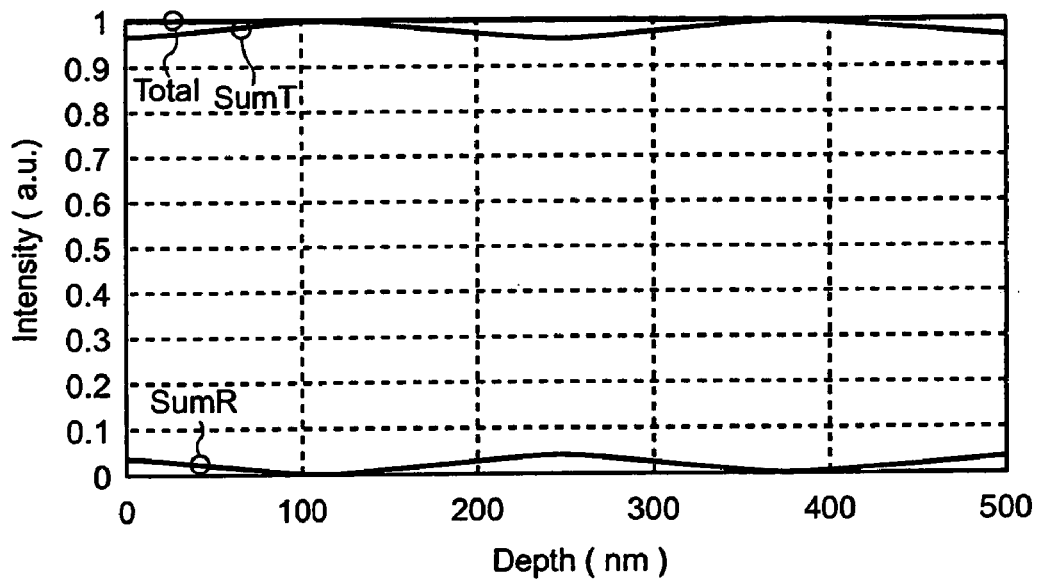
FIGS. 6A and 6B show diagrams to explain polarization properties of the polarization control element in Condition 3.

From FIG. 6A, it is clear that the response of a quartz glass grid (striped structure) is "dielectric" in regard to the TM polarized light. Appearance of the maximums and the minimums respectively noticed in the intensity of reflected light (SumR) and the intensity of transmitted light (SumT) are due to an interference between a quartz glass grid layer and substrate glass.

Figure 6B:
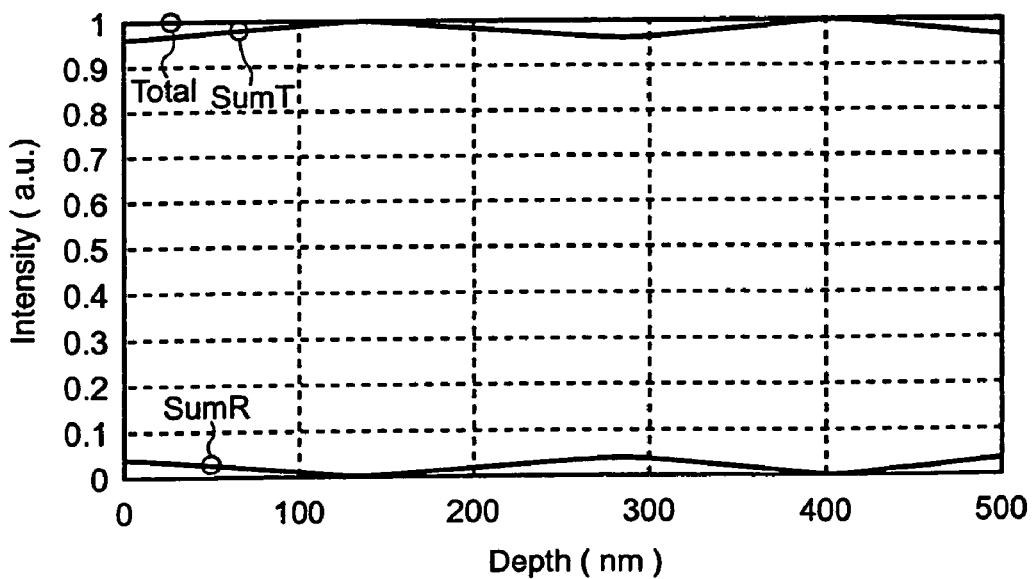

On the other hand, from FIG. 6B, it is clear that the response of the quartz glass grid is "dielectric" in regard to the TM polarized light, too. Appearance of the maximums and the minimums respectively noticed in the intensity of reflected light (SumR) and the intensity of transmitted light (SumT) are due to the interference between the quartz glass grid layer and the substrate glass.

Figure 7A:
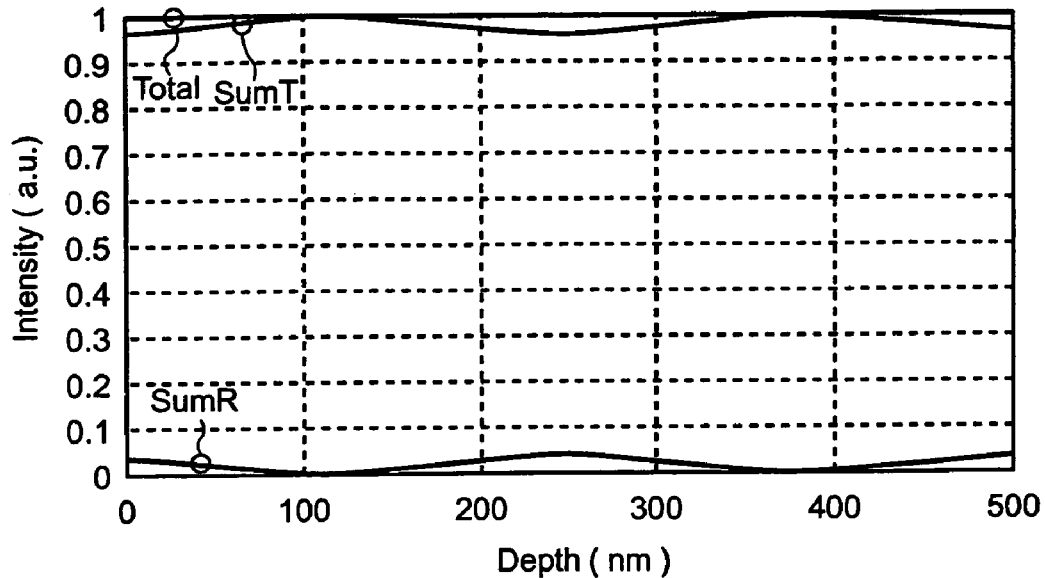
FIGS. 7A and 7B show diagrams to explain polarization properties of the polarization control element in comparison examples.
Figure 7B:
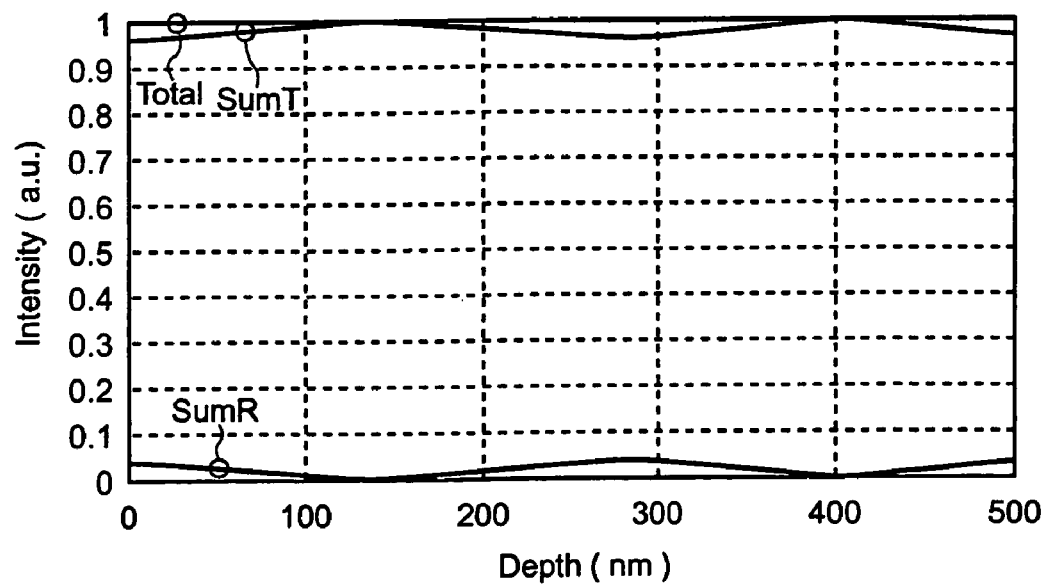

Based on the results of computation, it is clear that the sub-wavelength structure determined by the condition does not function effectively as the polarization control element. Results of the rigorous computation on the optical response of the quartz glass grid to confirm this are shown in FIG. 7A and FIG. 7B. Despite polarization, the results of the approximate computation (refer to FIG. 6A and FIG. 6B) and the results of the rigorous computation are shown to be in good agreement.

Under the above-mentioned three typical conditions, optical responses of the sub-wavelength structure were considered. From this consideration, the validity of designing the sub-wavelength structure based on such method described in the embodiment is proven. It should be pointed out that differences between the TE polarized light and the TM polarized light regarding the degree of the agreement between the approximate computation and the rigorous computation are due to the fact that in the former, evanescent waves in the medium are not taken into consideration, while in the latter, they are considered. The coupling between the reflected light and the transmitted light by way of the evanescent waves in the structure needs to be taken into account for accurate predictions of the optical responses of a sub-wavelength structure.

Next, an example of a method of manufacturing the polarization control element will be described. The element conditions are selected such as to meet the relation of Condition 1 (first process), and the second medium is selected so as to meet the element conditions. The striped structure is formed (second process). A variety of processing methods may be employed for the second process. As an example thereof, a combination of interference exposure using a UV laser and a dry etching process will be described in the following.

FIGS. 8A-8F are sectional views of a process explaining an example of manufacturing the polarization element.

Figure 8A:
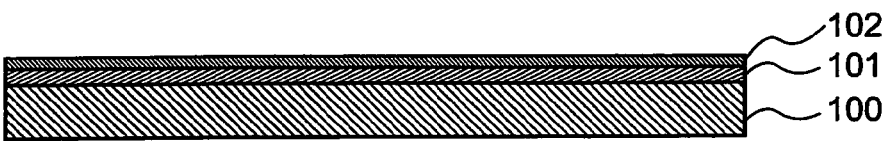
FIGS. 8A-8F show sectional views of a process to explain an example of the manufacturing method of the polarization control element.

As shown in FIG. 8A, a metallic thin film 101 and an anti-reflection preventing film 102 are formed on a surface of a substrate 100. In the example, a 1-mm-thick glass substrate is used as the substrate 100. Further, as the metallic thin film 101, an aluminum film is formed to a film thickness of about 160 nm by a film-making process such as sputtering and vacuum deposition. Moreover, the anti-reflection preventing film 102 is formed to a film thickness of about 75 nm through the film-making process such as spin coat.

Figure 8B:
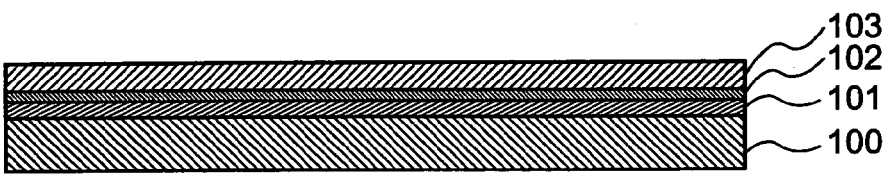

Next, as shown in FIG. 8B, a photosensitive film 103 is formed on an upper side (upper surface of the anti-reflection preventing film 102 in the example) of the metallic thin film 101 as a work piece. In the embodiment, a chemically amplified photoresist is used. Through making a film out of this by means of the film-making process such as spin coat, the photosensitive film 103, about 450 nm thick, is formed.

At this point, the photoresist of the chemical multiplying type is a mixed solution of a resin, an acid generating agent, and a solvent whose properties vary as it is sensitively affected by minute quantities of alkaline impurities such as ammonia because of using acid generating in a photochemical reaction. Hence, in the embodiment, an atmosphere in which the process and the succeeding exposure process and development process are carried out is set such that the concentration of alkaline impurities may be under 1 ppb.

Figure 8C:
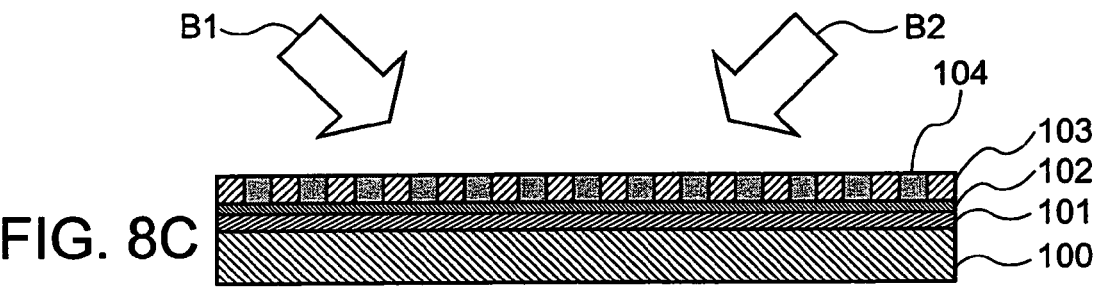

Next, as shown in FIG. 8C, two beams B1 and B2 of a wavelength, which is 266 nm in the example and shorter than a wavelength of visible light, are fed to intersect each other at a preset angle to generate interference light, so that by irradiating the interference light, whereby the photosensitive film 103 is exposed. For example, by setting the intersecting angle of the two beams B1 and B2 at 62 degrees, an interference light of a period of 150 nm is obtained, whereby a latent image pattern 104 corresponding to the interference light is formed on the photosensitive film 103.

Figure 8D:
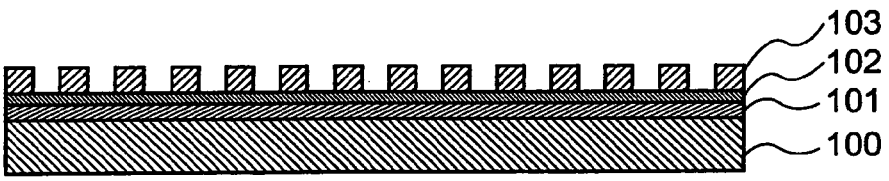

Next, as shown in FIG. 8D, the photosensitive film 103, after the exposure is subjected to baking and development, causes a shape corresponding to the interference light pattern to manifest itself on the photosensitive film 103. This enables a photoresist pattern of a period of 150 nm to be produced on the metallic thin film 101.

Figure 8E:
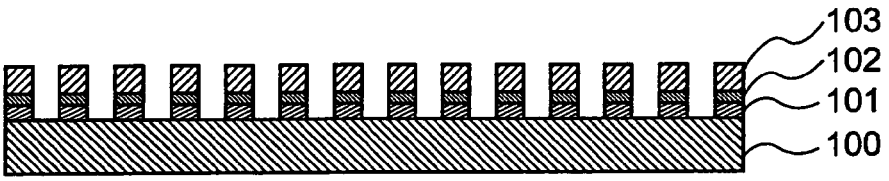

Next, as shown in FIG. 8E, the photosensitive film 103 after the development is used as an etching mask and etching is carried out, processing the metallic thin film 101 as the work piece. By this, the photoresist pattern is transferred to the metallic thin film 101.

Figure 8F:

As an etching method, in principle, either wet etching or dry etching can be used. Especially, what is best suited for dry etching is ICP (inductively coupled plasma) and ECR (electron cyclotron resonance). Thereafter, as shown in FIG. 8F, the reflection preventing film 102 and the photosensitive film 103 are removed. This makes it possible to obtain a polarization control element of the metallic grid type constituted by placing a finely striped structure consisting of aluminum on the substrate 100.

Figure 9:
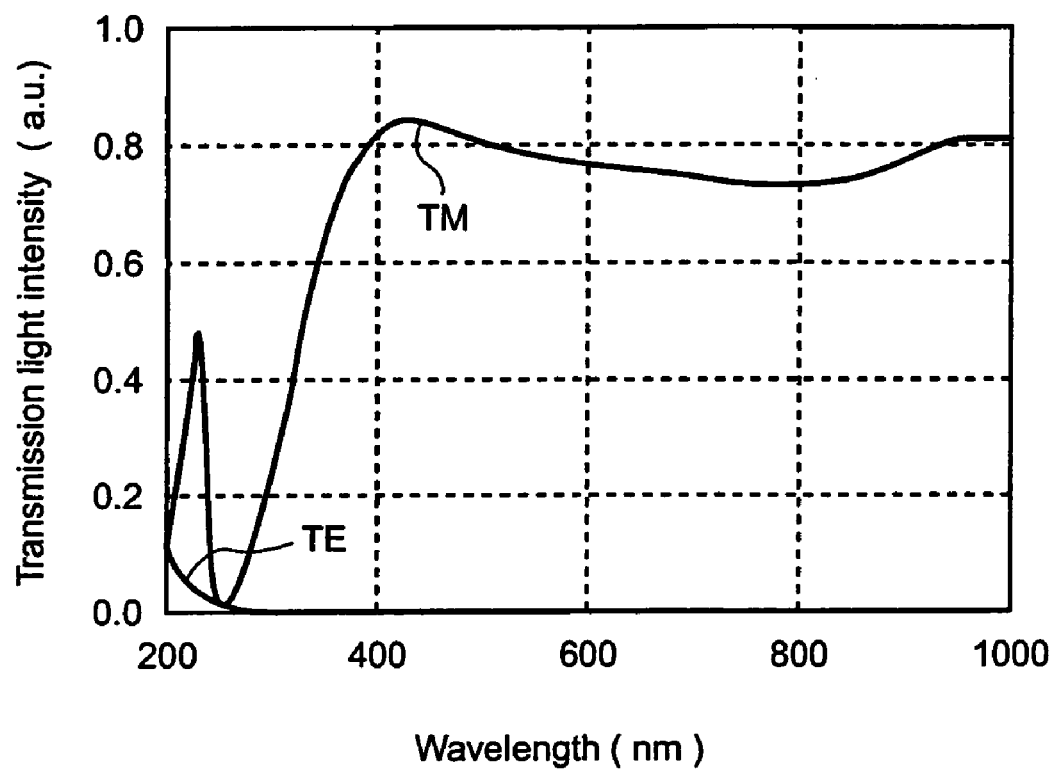
FIG. 9 is a diagram showing an example of optical properties of the polarization control element manufactured by a manufacturing method of one embodiment.

FIG. 9 is a diagram showing an example of optical properties of a polarization control element manufactured according to the above-mentioned manufacturing method. In the diagram, solid lines indicate theoretical predictions, and experimental measurements are plotted. According to this measurement, a transmission factor of the polarization control element consisting of the aluminum grid is 80% and its degree of polarization is 400, thus indicating that it is good enough for practical use.

Since such polarization control element excels in optical resistance in addition to polarization properties, for example, it can be applied to electronic equipment such as a liquid crystal projector. Currently available polarization control elements using organic materials suffer considerable deterioration of their properties through long hours of irradiation by a high-luminance lamp, thus shortening the life of the liquid crystal projector. However, use of the polarization control element of the embodiment makes it possible to provide for a long life of the liquid crystal projector.

Figure 10A:
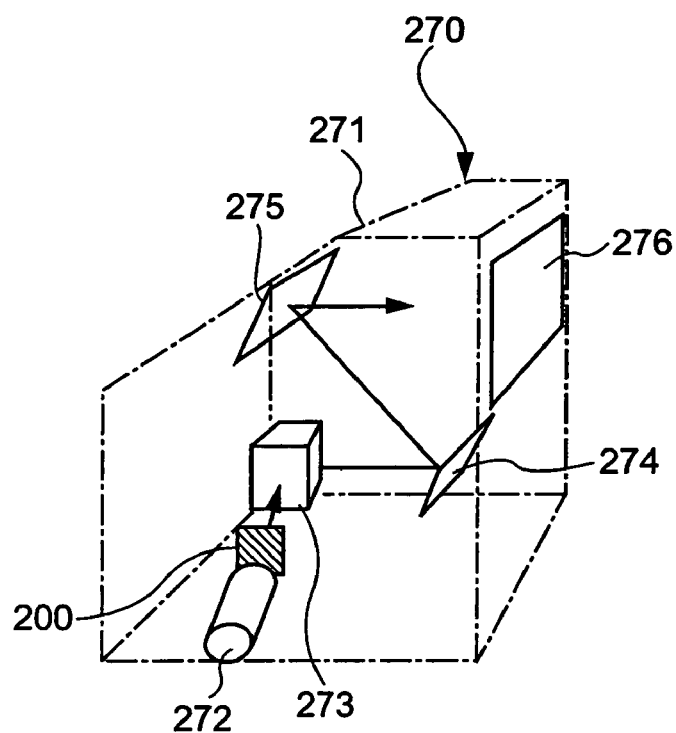
FIGS. 10A and 10B show diagrams to explain specific examples of electronic equipment.
Figure 10B:
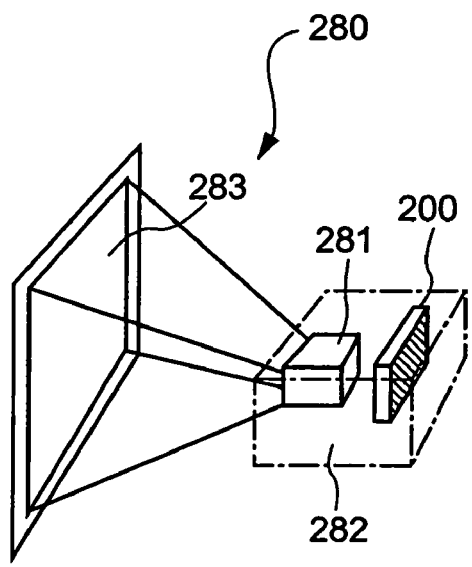

FIGS. 10A and 10B are diagrams explaining specific examples of electronic equipment. FIG. 10A is an example of application to a rear type projector. The projector 270 is equipped with a liquid crystal panel 200 comprising a frame 271, a light source 272, a synthetic optical system 273, mirrors 274 and 275, a screen 276, and a polarization control element of the embodiment.

FIG. 10B is an example of application to a front type projector. The projector 280 is equipped with a liquid crystal panel 200 comprising a frame 282, an optical system 281, and a polarization control element of the embodiment. It is capable of showing images on a screen 283. Further, electronic equipment is not limited to these, and for example, in addition to these, a fax machine with a display function, a digital camera finder, a portable TV, an electronic note, an electronic bulletin board, and an advertising display are included.

In this manner, according to the embodiment, based on relatively simple conditional expressions, there are clarified the guidelines for selecting materials necessary for realizing the polarization control element consisting of the sub-wavelength structure.

Accordingly, the freedom of structural design is largely broadened, so that there is no necessity of designing within a category of limited material candidates (for example, aluminum and silver). This makes it possible to realize an optimum sub-wavelength structure and obtain a polarization control element which has better properties.

It should be noted that the invention is not limited to the contents of the above-referenced embodiment, and that various modifications are possible within the scope of the spirit of the invention.

What is claimed is:

1. A manufacturing method of a polarization control element comprising:

establishing a first medium in which the polarization control element will be used, determining a second medium based on the following element conditions $Re[e1]>0$, $fRe[e1]+(1-f)[Re[e2]<0$, and $Im[e2]>0$, where a complex dielectric constant of the first medium is e1, a complex dielectric constant of a second medium is e2, a fill factor rate of the second medium is $f(0<f<1)$, a real part of the complex number is Re, and an imaginary part is Im, and manufacturing the polarization control element with the second medium by forming a striped structure of a period shorter than a wavelength of light to be subject to control.

2. Electronic equipment comprising the polarization control element manufactured by the manufacturing method according to claim 1.

3. A designing method of a polarization control element comprising:

establishing a first medium in which the polarization control element will be used, determining a second medium based on the following element conditions $Re[e1]>0$, $fRe[e1]+(1-f)[Re[e2]<0$, and $Im[e2]>0$, where a complex dielectric constant of the first medium is e1, a complex dielectric constant of the second medium is e2, a fill factor of the second medium is $f(0<f<1)$, a real part of the complex number is Re, and an imaginary part is Im, and designing the polarization control element with the second medium by forming a striped structure of a period shorter than a wavelength of light to be subject to control.

* * * * *